Oct. 22, 1957     A. J. KIZAUR     2,810,837
CASSETTE
Filed June 17, 1953
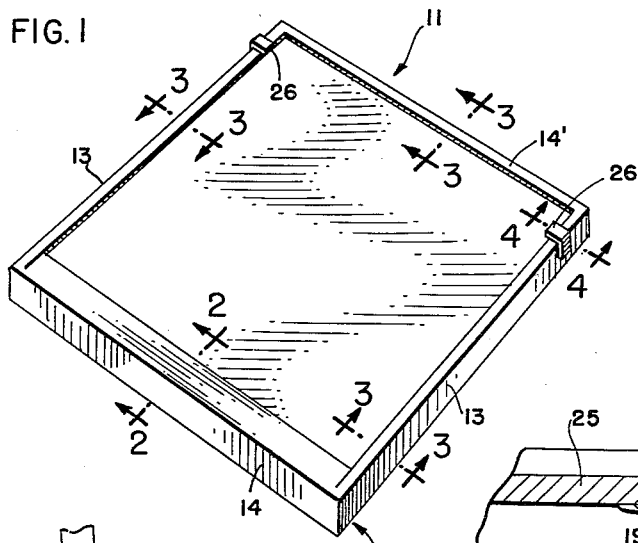
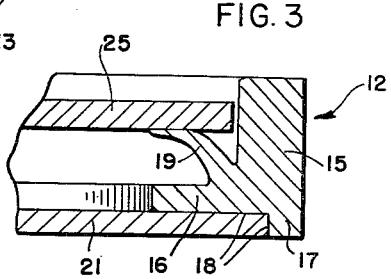
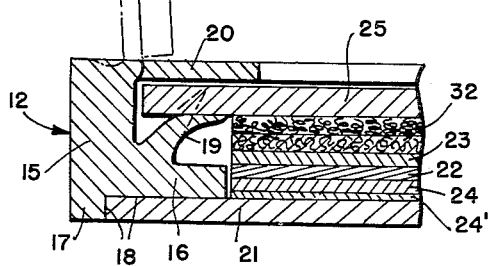
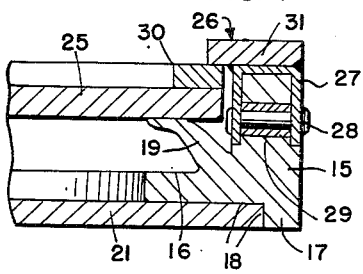
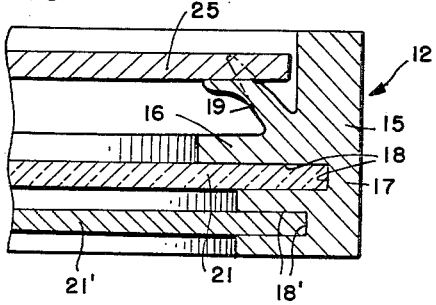
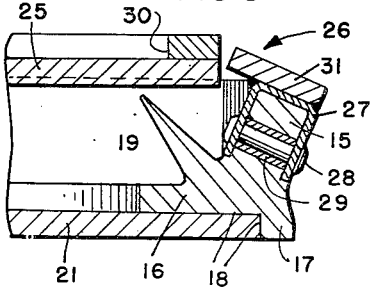
INVENTOR:-
ARTHUR J. KIZAUR
BY:-
Junius F. Cook, Jr.
ATTORNEY

United States Patent Office 2,810,837
Patented Oct. 22, 1957

2,810,837
CASSETTE

Arthur J. Kizaur, Pewaukee, Wis., assignor to General Electric Company, a corporation of New York Application June 17, 1953, Serial No. 362,307

8 Claims. (Cl. 250—68)

The present invention relates in general to holding frames for ray sensitive sheet material and has more particular reference to cassettes for receiving and supporting sensitive sheet material in position for ray exposure, the invention pertaining especially to an improved cassette structure particularly suitable for enclosing X-ray sensitive sheets of the sort commonly used in the making of radiographic pictures. In its broader aspects, however, the invention is not necessarily limited to cassettes for X-ray sensitive material, but may have application in holding frames for material sensitive to visible and other light rays.

Cassettes for the support of sensitive sheet material are primarily required to hold the supported material firmly in a predetermined plane upon which a ray carried picture image to be recorded on the sensitive cassette-enclosed sheet may be focused or otherwise applied. Accordingly, it is conventional to provide cassettes of exceedingly rigid construction, usually comprising frames of steel, wood, or other material of strong, relatively rigid and firmly self-supporting character, in order to incorporate substantial rigidity in the cassette structure. The manufacture of cassettes embodying rigid frame forming elements is necessarily a relatively expensive operation, for which reason cassettes of the sort heretofore provided have been costly and also relatively heavy, although cassette lightness is an exceedingly desirable attribute, especially where the cassettes are used in apparatus designed to move the cassette rapidly from inactive or stand-by position into projected picturing position, as in the structure shown in United States Letters Patent No. 2,277,330 of March 24, 1942, covering plate changer mechanism invented by Arthur J. Kizaur.

An important object of the present invention, accordingly, is to provide a holder frame or cassette that is exceedingly light in weight, yet adequately rigid to perform its sheet supporting function.

A further object is to provide a cassette of the character mentioned, which is adapted to be manufactured at low cost.

Another important object resides in providing a cassette comprising a peripheral frame of light weight resilient material and closure panels mounted on the frame in position to enclose ray sensitive sheet material within the frame and between the panels.

Another important object is to provide a cassette comprising a peripheral frame of light weight relatively flexible material, including means for adequately rigidifying the frame to permit the same to function adequately as a cassette for ray sensitive flexible sheet material; a further object being to form the frame of inexpensive, light weight, rubber-like material.

Another important object is to provide a cassette comprising a marginal frame provided with a resilient rubber-like flap on and extending at a side of the frame, and a panel secured at one edge to the flap in position to form a hinged closure for the back of the frame.

Another important object resides in providing a cassette comprising a peripheral frame of flexible rubber-like material, a panel of relatively rigid material cemented at its edges on the frame to close the front thereof and to rigidify the material of the frame so that the same may function as a light weight cassette for firmly supporting flexible ray sensitive sheet material in position for ray exposure.

Another important object is to provide inexpensive latch means for securing a movable back closure panel in closed position on the frame; a further object being to provide a pair of opposed latches on opposite sides of the frame, the latches comprising relatively rigid members secured upon the resilient marginal frame, in position to overlie an edge of the movable closure panel and hold the same in closed position, the latch members being retractable outwardly of the edge of the panel, to release the same, by virtue of the resilience of the marginal frame at the place where the latch member is mounted thereon.

Another important object is to provide a cassette for ray sensitive sheet material comprising a peripheral frame having an inwardly extending resilient flange forming a resilient circumferential lip inclined toward the back of the frame, in position to yieldingly engage the marginal edges of a back closure panel, when the same is in closed position on the frame, in order to provide a light seal with the closure panel, at and around its marginal edges.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Fig. 1 is a perspective view of a cassette embodying the present invention;

Figs. 2, 3, 4, and 5 are sectional views respectively taken substantially along the lines 2—2, 3—3, 4—4, and 5—5, in Fig. 1; and Fig. 6 is a sectional view, similar to Fig. 3, to illustrate a modified device embodying the invention.

To illustrate the invention, the drawings show a cassette or holder frame 11 for ray sensitive sheet material. While the invention is not necessarily limited to frames for supporting X-ray sensitive material, but indeed may have useful application in frames for mounting material sensitive to visible light and to light rays within the ultra-violet and infra-red bands of the light spectrum, the present invention was conceived and developed more especially to provide an improved cassette structure especially well suited for enclosing X-ray sensitive sheet material of the sort used in making radiographic pictures by exposing the material to X-rays latently carrying the picture to be recorded. X-ray sensitive material usually is also sensitive to visible light and consequently has to be stored in light-tight containers and mounted in light-tight cassettes before and after exposure of the material to X-rays and until the materials chemically treated to set the pictured image therein following exposure of the material to picture carrying rays.

A cassette for supporting sensitive material for radiographic purposes is required to present the sheet of sensitive material as nearly as possible in absolutely flat condition in the cassette. It is also desirable to provide for mounting the sheet of sensitive material in the cassette either alone or together with sheet-like intensifying screens which may be disposed in position overlying either or both of the opposite faces of the ray sensitive sheet.

In order to assure that the supported sheet of sensitive material is held rigidly in a desired plane, it has heretofore been conventional to provide cassettes comprising exceedingly rigid and relatively heavy peripheral frames containing a front support panel and a removable back or closure panel for mounting the sensitive sheet material together with a resilient backing pad and one or more intensifying screens, if desired, within the rigid frame and between the front and back cover panels of the cassette. As an example of conventional cassette construction, reference is made to United States Letters Patent No. 2,340,378 of February 1, 1944, for Cassette Structure, invented by Julius J. Grobe, wherein desired rigidity is accomplished by means of front and back cover panels marginally supported within a peripheral frame of generally tubular fabricated sheet metal construction, designed to provide unusually rigid frame characteristics.

Conventional cassette structures are relatively expensive devices because of the high cost of fabricating a peripheral frame in fashion affording desired cassette rigidity. Conventional cassettes, embodying peripheral frames having the degree of rigidity heretofore considered essential, are relatively heavy structures. Difficulty also is encountered in providing an effective light seal in conventional cassette structures between the marginal edges of the removable back cover plate and the surrounding peripheral frame of the cassette, the difficulty of providing an adequate light-tight seal being to some degree connected with the problem of hingedly connecting the back cover panel on the cassette frame.

The cassette 11 of the present invention comprises a peripheral rim 12 of resilient rubber-like material that is exceedingly light in weight as compared with steel, wood and other rigid materials heretofore used in the construction of cassette frames. The frame 12 is of preferably rectangular configuration comprising spaced side members 13 and spaced apart end members 14 and 14' interconnecting the opposite ends of the side members 13.

The side and end members 13, 14, and 14' may comprise molded strips of rubber-like material sectionally configurated to provide a body portion 15 of somewhat greater width than thickness and having a lateral flange 16 extending from the body portion 15, at one end thereof, and a rib 17 extending from the body portion, at said end thereof, in a direction normal to the flange 16, to form a panel edge receiving seat 18 at the junction of the flange 16 with the rib 17. The strip material also includes an integral inclined lip forming flange 19 formed on the strip as at the junction of the flange portion 16 with the body portion 15, said flange 19 extending in a direction to substantially equally divide the right angle made by the flange 16 with the adjacent surface of the body portion 15. The lip forming flange 19 is preferably tapered, from its strip connected base toward its free edge, and is inclined in a direction diagonally away from the flange 16 and toward the end of the body portion 15 remote from the seat 18.

The strip forming the side 14 of the frame may also include a flange 20 formed integrally on the body portion 15 at the end thereof remote from the flange 16, said flange 20 extending in parallel spaced apart relation with respect to the flange 16, the flanges 16 and 20 both extending on the same side of the body portion 15 at the opposite ends thereof. The flange 20 preferably is relatively thin and flexible as compared with the flange 16, whereby the flange 20 may provide a flexible flap hingedly connected at its base upon the body portion of the strip and extending thence normally adjacent the free edge of the lip forming flange 19, which projects from the base of the flange 16 upwardly toward the flange 20. The side walls 13 and the end wall 14' preferably omit the flange 20 entirely.

The opposite ends of the frame members 13, 14, and 14' may be mitered and sealingly interconnected in any suitable or preferred fashion, as by means of suitable corner brackets of sheet metal, riveted or otherwise secured to the abutting corner forming ends of the frame members, or the frame members may be secured together by cementing, vulcanizing, or otherwise integrating the parts at the corners of the frame. When the members 13, 14, and 14' are so joined together, the frame will provide a marginal seat comprising the seat forming portions 18 of all of the members 13, 14, and 14'; and a front panel 21 may be secured in the frame by cementing the marginal edges thereof in said peripheral seat. The panel 21 may comprise any suitable or preferred material which is relatively rigid and self-supporting, and which is also substantially transparent to the rays to which the sheet material to be enclosed in the cassette is sensitive.

For radiographic purposes the panel 21 may comprise synthetic plastic material, or metal such as magnesium, aluminum, beryllium, or alloys thereof, or other material substantially transparent to X-rays and substantially opaque to visible light. If, however, the cassette is to be used for mounting material for exposure to visible light rays, the panel 21 may be made of glass, fused quartz, methyl methacrylate or other material transparent to visible light rays. In such case, however, suitable readily removable shutter means 21' of material opaque to visible light may be provided on the frame 15 in position normally overlying the panel 21, as shown in Fig. 6 of the drawings. Such shutter 21' may be slidably mounted, at its edges, in grooves 18' formed in the frame forming members 13 and 14', outwardly of the panel seat 18, whereby the shutter may be readily removed whenever it be desired to uncover the panel 21 for the exposure of sensitive material to visible light rays.

By bonding the flexible frame 15 upon the edges of a panel 21 of relatively rigid material, the frame itself is sufficiently rigidified to allow it to function satisfactorily as a cassette for enclosing and supporting flexible sheet material. The frame 15, with panel 21 mounted thereon, forms a shallow container adapted to receive a sheet 22 of flexible material, to be supported in the cassette, either alone or together with additional sheets 23 and 24, which may comprise intensifying screens of the sort commonly used in conjunction with ray sensitive material in the making of X-ray pictures or radiographs. In addition to the frame 15 and panel 21, the cassette 11 may comprise a cover panel 25 for removably enclosing the back of the frame in order to hold the sheet of material 22, together with the layers 23 and 24, if the same be included in the cassette with the sheet 22, in flat condition between the panel 21 and the back cover 25. The members 23 and 24, if used, may be disposed on opposite sides of the sheet 22. If desired, the screen 24 may be attached permanently to the panel and thereby secured in the cassette, as by cementing the screen to a layer of cardboard 24', said cardboard layer in turn being secured to the inner face of the panel 21.

The cover panel 25 preferably comprises a flat plate of sheet metal such as magnesium, aluminum, beryllium, or synthetic plastic, or other material which is opaque to visible light, which also is preferably transparent to penetrating rays such as X-rays, and which is of relatively rigid self-sustaining character. The panel 25 preferably has rectangular marginal configuration and the same is sized to fit snugly within the space defined by the body portions 15 of the interconected members 13, 14, and 14'. Accordingly, when in closed position, the panel 25 may rest upon the free tapered edge portions of the flanges 19 of the frame members, suitable means being provided for latching the member 25 in such closed position, whereby the resilient wiping engagement of the edge of the flanges 19 form an effective light-tight seal around the marginal edges of the back cover panel 25.

The cover panel 25 is preferably hingedly secured to the frame by cementing the flexible flange 20 to the panel 25 along a side edge thereof, as shown more particularly in Fig. 2 of the drawings. The cover panel 25, accordingly, may be moved to the open position, shown in dotted lines in Fig. 2, merely by flexing the flange 20 along its line of junction with the body portion 15 of the frame member 14. The cover panel 25 also may be swung downwardly into closed position, in the frame. When the panel is in such closed position, its marginal edges make a tight seal with the flange means 19, to thereby enclose a sheet of sensitive material 22 in light excluding fashion, between the panels 21 and 25 and within the marginal frame means 12.

In order to latch the cover panel 25 in closed position in the frame 12, a pair of latch members 26 may be provided upon the side members 13 of the cassette frame, said latches being mounted preferably adjacent the frame member 14' and remote from the hinge forming flap 20. Each latch 26 may comprise a sheet metal clip 27 having portions embracing the inner, outer and top faces of the body portion 15 of the member 13 on which it is mounted, the bracket 27 being secured, on said member, as by means of a rivet 28, which penetrates the body portion 15 and the opposite sides of the clip, the portions of the rivet which extend in the body portion 15 being enclosed within a sleeve 29, which bears at its opposite ends upon the facing surfaces of the opposite sides of the clip, to permit the rivet to be applied in the relatively soft material of the member 13. It will be seen that the clip 27 extends immediately outwardly of the edge of the panel 25, which may be provided with a latching embossment or land 30 in position to register with the clip 27, when the panel is in closed position in the cassette frame. The latch 26 may comprise a lug 31 welded or otherwise secured on the clip 27, the lug 31 having a nose portion in position to project above and to latchingly engage with the embossment 30, when the panel 25 is in closed position.

When the panel is in closed position, it will be seen that the light sealing flanges 19 will be deflected downwardly and resiliently will urge the panel 25 to yieldingly press the embossments 30 against the latch lugs 31. In order to release the latches 26, it is merely necessary to draw the same mutually outwardly of the marginal edges of the panel 25, such outward movement of the lugs 31 being permitted by the flexibility of the frame members 13, as shown more especially in Fig. 5 of the drawings. As soon as the lugs 31 are drawn outwardly of the edges of the panel 25, the resilence of the sealing flange 19 will cause the panel 25 to pop out of the frame 12, so that the hinge remote edge of the panel 25 may be easily grasped to shift the same to the fully opened position shown in dotted lines in Fig. 2.

Resilient cushion means 32 may be mounted upon the inner face of the panel 25 in order to obtain substantially uniform resilient pressure upon the enclosed sheet 22 throughout the pressing area of the cover panel 25. The pressing means may comprise any suitable or preferred resilient material mounted upon the inner face of the panel 25 in position to extend within the flexible light sealing flange 19.

Cassettes made in accordance with the present invention are of light weight, yet the same are fully capable of holding flexible sheet 22 firmly in flat condition between the relatively rigid front and back panels 21 and 25, whereby the supported sheet is maintained in a precise plane for exposure to rays to which it is sensitive. Not only is the frame exceedingly light in weight, as compared with conventional cassettes of the sort heretofore provided, but the resilient character of the peripheral frame 12 renders the structure resiliently resistant to damage, in the event that the same be dropped accidentally or otherwise subjected to frame distortiig impact, during the service life of the device. Furthermore, the cassette of the present invention can be manufactured at exceedingly low cost, since the same merely comprises inexpensive frame forming strips of rubber-like material and front and back panels comprising plain flat plates that can be assembled in the frame at comparatively low cost to form the cassette of the present invention.

It is thought that the invention and its numerous attendant advantages will be fully understood from the foregoing description, and it is obvious that numerous changes may be made in the form, construction and arrangement of the several parts of the cassette without departing from the spirit or scope of the invention, or sacrificing any of its attendant advantages, the forms herein disclosed being preferred embodiments for the purpose of demonstrating the invention.

The invention is hereby claimed as follows:

1. A cassette for sensitive sheet material comprising a frame, a ray transparent front panel secured at its edges on said frame in position enclosing the front side thereof, said frame having a sealing lip of resilient rubber-like material formed thereon in position extending entirely around the frame, said lip extending inwardly of the frame and being inclined toward the back of the frame, a back cover panel, and means to releasably secure said cover panel in said frame in position enclosing the back side thereof and pressing upon said lip in light-tight fashion at the edges of said back panel.

2. A cassette for sensitive sheet material comprising a frame, a ray transparent front panel secured at its edges on said frame in position enclosing the front side thereof, said frame being formed with peripherally extending integral flange means overlying the marginal edges of said front panel, said frame having a sealing lip of resilient rubber-like material formed thereon in position extending entirely around the frame, said lip extending inwardly of the frame and being inclined toward the back of the frame, a back cover panel, and means to releasably secure said cover panel in said frame in position enclosing the back side thereof and pressing upon said lip in light-tight fashion at the edges of said back panel.

3. A cassette for sensitive sheet material comprising a frame, a ray transparent front panel secured at its edges on said frame in position enclosing the front side thereof, said frame having a sealing lip of resilient rubber-like material formed thereon in position extending entirely around the frame, said lip extending inwardly of the frame and being inclined toward the back of the frame, a back cover panel hingedly supported along an edge thereof on said frame, and means to releasably secure said cover panel in said frame in position enclosing the back side thereof and pressing upon said lip in light-tight fashion at the edges of said back panel.

4. A cassette for sensitive sheet material comprising a frame, a ray transparent front panel secured at its edges on said frame in position enclosing the front side thereof, said frame having a sealing lip of resilient rubber-like material formed thereon in position extending entirely around the frame, said lip extending inwardly of the frame and being inclined toward the back of the frame, a flange of flexible rubber-like material on and extending inwardly of said frame along a side thereof and behind said lip, a back cover panel secured along an edge thereof to said flange and hingedly supported thereby on said frame, and means to releasably secure said cover panel in said frame in position enclosing the back side thereof and pressing upon said lip in light-tight fashion at the edges of said back panel.

5. A cassette for sensitive sheet material comprising a frame of flexible material, a ray transparent front panel of relatively rigid self-supporting material secured at its edges on said frame in position enclosing the front side thereof, a sealing lip of resilient material integral with said frame and formed thereon in position extending entirely around the frame, said lip extending inwardly of the frame and being inclined toward the back of the frame, a back cover panel, and means to releasably secure said cover panel, in said frame, in position enclosing the back side thereof and pressing upon said lip in light-tight fashion at the edges of said back panel.

6. A cassette for sensitive sheet material comprising a frame of flexible material, a ray transparent front panel secured at its edges on said frame in position enclosing the front side thereof, a sealing lip of resilient material integral with said frame and formed thereon in position extending entirely around the frame, said lip extending inwardly of the frame and being inclined toward the back of the frame, a back cover panel of relatively rigid self-supporting material, and means to releasably secure said cover panel, in said frame, in position enclosing the back side thereof and pressing upon said lip in light-tight fashion at the edges of said back panel.

7. A cassette for light sensitive sheet material comprising a frame, a light transparent front panel secured at its edges on said frame in position enclosing the front side thereof, said frame having a sealing lip of resilient rubber-like material formed thereon in position extending entirely around the frame, said lip extending inwardly of the frame and being inclined toward the back of the frame, a back cover panel, means to releasably secure said cover panel in said frame in position enclosing the back side thereof and pressing upon said lip in light-tight fashion at the edges of said back panel, a light opaque shutter and means to removably secure the same on said frame in position covering said front panel.

8. A cassette for light sensitive sheet material comprising a frame, a light transparent front panel secured at its edges on said frame in position enclosing the front side thereof, said frame having a sealing lip of resilient rubber-like material formed thereon in position extending entirely around the frame, said lip extending inwardly of the frame and being inclined toward the back of the frame, a back cover panel, means to releasably secure said cover panel in said frame in position enclosing the back side thereof and pressing upon said lip in light-tight fashion at the edges of said back panel, a light opaque shutter and means to removably secure the same on said frame in position covering said front panel, said frame being formed with grooves sized to removably receive edge portions of said shutter in light-tight fashion adjacent and outwardly of the edges of said transparent front panel.

References Cited in the file of this patent

UNITED STATES PATENTS

| | | |
|---|---|---|
| 44,169 | Eddy | Sept. 13, 1864 |
| 1,564,269 | Peyser | Dec. 8, 1925 |
| 1,631,497 | Marler | June 7, 1927 |
| 2,357,969 | Powers | Sept. 12, 1944 |
| 2,371,843 | Powers | Mar. 20, 1945 |
| 2,494,740 | Boucher | Jan. 17, 1950 |
| 2,544,268 | Land | Mar. 6, 1951 |